United States Patent
Takahashi

[11] Patent Number: 6,021,394
[45] Date of Patent: Feb. 1, 2000

[54] SALES MANAGEMENT METHOD IN AUTOMATIC VENDING MACHINE

[75] Inventor: Toshiyuki Takahashi, Osaka-fu, Japan

[73] Assignee: Sanyo Electric Co., Ltd., Osaka-Fu, Japan

[21] Appl. No.: 08/913,288

[22] PCT Filed: Dec. 27, 1996

[86] PCT No.: PCT/JP96/03839

§ 371 Date: Sep. 1, 1998

§ 102(e) Date: Sep. 1, 1998

[87] PCT Pub. No.: WO97/24701

PCT Pub. Date: Jul. 10, 1997

[51] Int. Cl.$^7$ .................................................. G06F 17/60
[52] U.S. Cl. ............................ 705/10; 705/22; 235/381; 235/385
[58] Field of Search ................... 705/1, 10, 22, 705/28; 235/381, 385; 364/479.01, 479.11, 479.14

[56] References Cited

U.S. PATENT DOCUMENTS

| | | | |
|---|---|---|---|
| 5,339,250 | 8/1994 | Durbin | 364/479.07 |
| 5,608,643 | 3/1997 | Wichter et al. | 364/479.14 |
| 5,615,109 | 3/1997 | Eder | 705/8 |
| 5,765,143 | 6/1998 | Sheldon et al. | 705/28 |
| 5,844,808 | 12/1998 | Konsmo et al. | 364/479.14 |

FOREIGN PATENT DOCUMENTS

| | | |
|---|---|---|
| 1-259488 | 10/1989 | Japan . |
| 4-304593 | 10/1992 | Japan . |
| 5-108928 | 4/1993 | Japan . |
| 5-120525 | 5/1993 | Japan . |
| 5-135274 | 6/1993 | Japan . |
| 5-334543 | 12/1993 | Japan . |
| 6-4745 | 1/1994 | Japan . |

*Primary Examiner*—Allen R. MacDonald
*Assistant Examiner*—Hani M. Kazimi
*Attorney, Agent, or Firm*—Darby & Darby

[57] ABSTRACT

The sales management method for automatic vending machines of the present invention lightens the processing burden of each automatic vending machine for sales estimates. Information required for sales estimates are transmitted from the automatic vending machine 1 to the center computer 11 and processed by the center computer 11 to make sales estimates for each automatic vending machine 1. Each automatic vending machine 1 makes sales preparations based on the results of this estimate to increase sales to meet growing demand at a specific date and time. Utilizing high performance of the center computer 11, sales estimates are made by combining various information such as weather forecast information and information on installation sites and the like with the past sales information so as to improve estimate accuracy.

7 Claims, 4 Drawing Sheets

SALES MANAGEMENT METHOD IN AUTOMATIC VENDING MACHINE

FIELD OF THE INVENTION

This invention relates to a technology for allowing volume sales in a short period of time by estimating which product will be sold, how many and at what time zone of the day and preparing the product based on these estimates in an automatic vending machine.

BACKGROUND ART

Heretofore, in a cup type automatic vending machine for selling regular coffee and the like, after money such as coins and bills or a card such as a prepaid card (to be referred to as "money" hereinafter) has been inserted into the automatic vending machine and a product selection button has been depressed, coffee for one cup has been extracted and sold. However, since a waiting time for each sale is several tens of seconds with this system, a large number of customers cannot be handled at a time.

In recent years, there has been developed a cup type automatic vending machine of a system that a predetermined amount of coffee is previously made and stored in a storage tank at a peak time zone and supplied from the tank each time money is inserted and the product selection button is depressed. The automatic vending machine of this system is disclosed by Laid-open Japanese Patent Application No. Hei 1-237899. Employing this system, the waiting time is shortened to 10 seconds or so.

In this automatic vending machine, a built-in main control unit estimates sales of each day and as a result, extraction and storage operations are started a little before the estimated peak time zone. The sales estimates are made by recording the type of a product and a time each time a product is sold and keeping this record for a predetermined number of days so that information on which products and how many cups will be sold at what time zone of the day are estimated based on the sales information.

However, since sales estimates are made by each automatic vending machine in the above technology of the prior art, the prior art has a problem such that sales which is the primary operation of the automatic vending machine is interfered because of the large burden of processing the data. Further, since it is necessary to store a huge volume of sales information for making sales estimates for each of a wide variety of products, a large-capacity memory is required for each automatic vending machine, thereby boosting costs.

It is therefore an object of the present invention to solve the above problem, lighten the processing burden of each automatic vending machine for sales estimates and eliminate the need for a large-capacity memory.

DISCLOSURE OF THE INVENTION

To solve the above problem, in the sales management method for automatic vending machines of the present invention, a shared center computer processes information obtained from each automatic vending machine to make sales estimates for each automatic vending machine so that each automatic vending machine can start required sales preparations based on the sales estimates.

Furthermore, the center computer processes at least one among weather forecast information, sales environment information and sales information of a plurality of automatic vending machines to make sales estimates for each automatic vending machine.

In addition, the sales estimates are suitably corrected for each automatic vending machine based on the latest sales environment information before the time of starting sales preparations obtained from sales estimates of the center computer to start required sales preparations.

BEST MODE FOR CARRYING OUT THE INVENTION

Preferred embodiments of the present invention are described in detail hereinafter with reference to the accompanying drawings.

Figure 1:
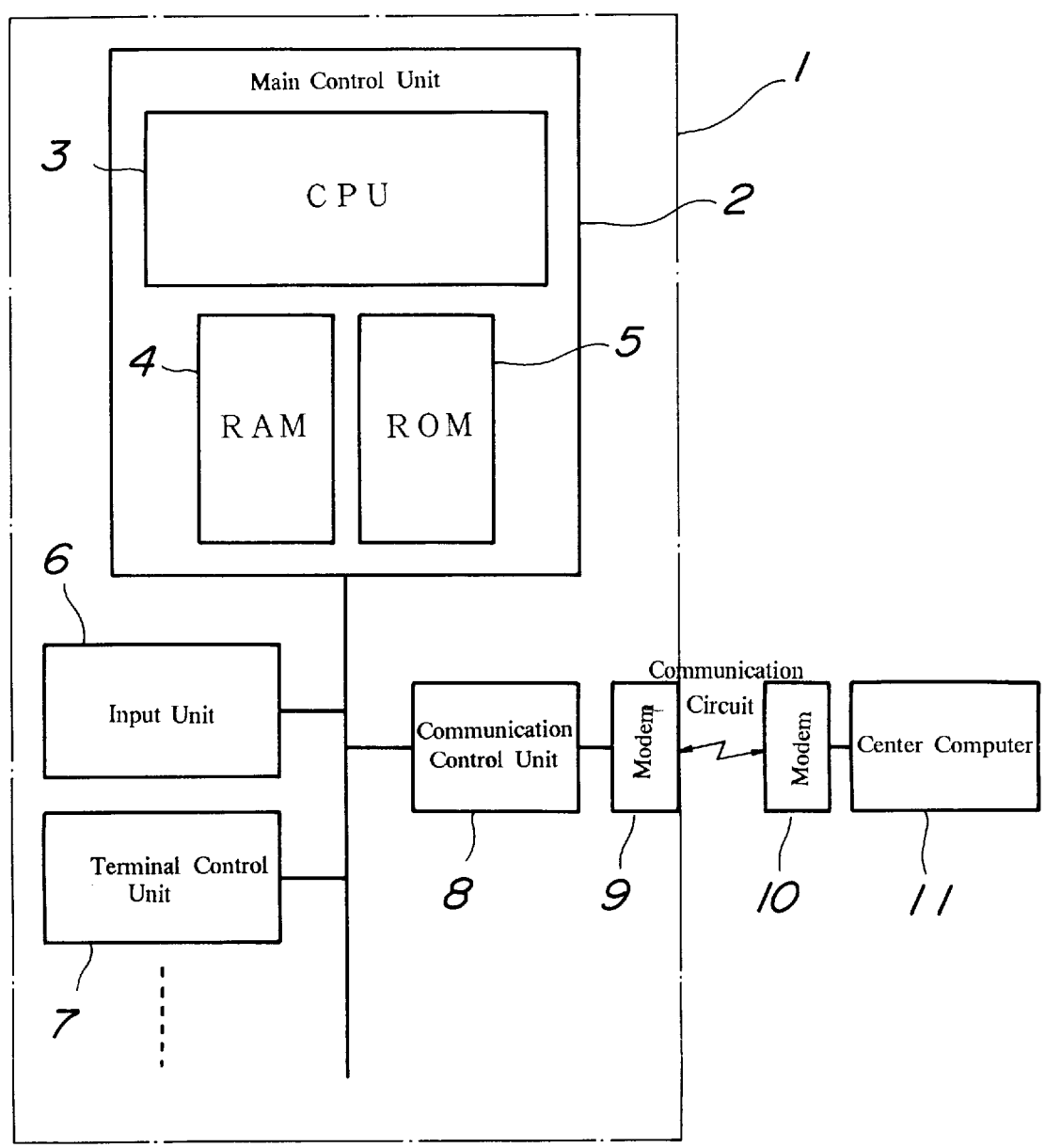
FIG. 1 is a block diagram showing the configuration of an apparatus.

FIG. 1 is a system diagram of a sales management method for automatic vending machines of the present invention. In FIG. 1, reference numeral 1 denotes an automatic vending machine, 2 a main control unit, 3 a CPU (Central Processing Unit), 4 a RAM (Random Access memory), 5 a ROM (Read Only Memory), 6 an input unit, 7 terminal control units, 8 a communication control unit, 9 and 10 modems and 11 a center computer installed at a proprietary company or the like.

The main control unit 2 of the automatic vending machine 1 comprises the CPU 3, the RAM 4 for storing programs and various data, the ROM 5 and the like and controls the terminal control units 6 such as an unshown money processing mechanism control unit, product sales mechanism control unit and the like collectively. Setting data, sales information and the like are stored and kept in the RAM 4. The input unit 6 has an unshown keyboard to input various data into the main control unit 2. Furthermore, the main control unit 2 can communicate data with the center computer 11 over a wired or radio communication circuit through the communication control unit 8 and the modems 9 and 10.

Figure 2:
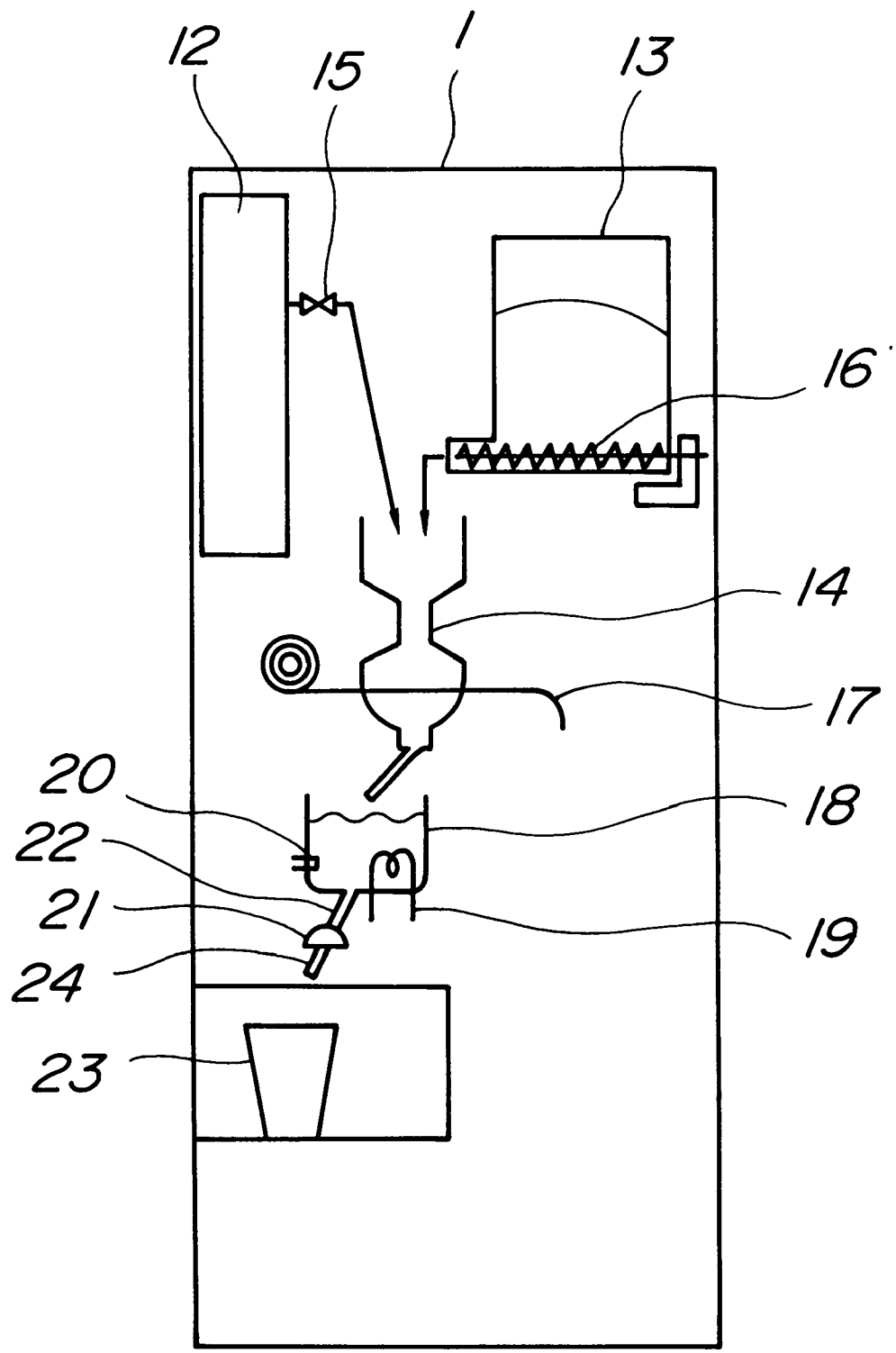
FIG. 2 is a schematic diagram showing the internal configuration of an automatic vending machine.

FIG. 2 is a schematic diagram showing the internal configuration of the automatic vending machine 1. Reference numeral 12 denotes a hot water tank for storing hot water and 13 an ingredient container for storing powdered coffee beans. Reference numeral 14 represents an extractor which is supplied with hot water from the hot water tank 12 by the opening of a hot water supply electromagnetic valve 15 and with powdered coffee beans from the ingredient container 13 by the rotation of an auger 16 and supplying and extracting coffee through a filter 17 by blowing high-pressure compressed air.

Reference numeral 18 denotes a storage unit which is capable of storing coffee for a plurality of cups extracted by the extractor 14 and incorporates a heater 19 for keeping coffee hot and a remaining amount detection sensor 20 for detecting the remaining amount of coffee in the storage unit 18. Numeral 21 is a drink supply valve which is provided within a drink supply pipe 22 communicating with the storage unit 18 and is opened at each time of sales to supply coffee into a cup 23 through a nozzle 24.

In the automatic vending machine 1, necessary sales preparations are made based on the results of sales estimate obtained by sales estimate processing which will be described hereinafter. For instance, in the automatic vending machine 1 installed at a factory, sales concentrate at recess periods. When it is estimated that 35 cups of coffee will be sold at a recess period from 10:00 a.m. to 10:10 a.m. as a result of sales estimates, coffee for 35 cups is extracted and stored in the storage unit 18 before 10:00 a.m., for example, in the automatic vending machine 1.

Therefore, the CPU 3 calculates that it takes 7 minutes to extract coffee for 35 cups when the extractor 14 can extract coffee for 5 cups at a time and each extraction takes 1 minute. Then, coffee extraction is started at 9:53 a.m., for example. Although the coffee extraction time may be prior to 9:53 a.m., in order to sell just extracted coffee, the time of starting extracting coffee is preferably as late as possible in consideration of the extraction time of an estimated sales volume.

As described above, at 9:53 a.m., the CPU 3 opens the hot water supply electromagnetic valve 15 and rotates the auger 16 to supply hot water and coffee beans for 5 cups to the extractor 14. The extractor 14 which is supplied with hot water and coffee beans extracts coffee repeatedly for a total of 35 cups and the extracted coffee is supplied into the storage unit 18. In the storage unit 18, the stored coffee is kept hot by the heater 19 so as to prevent the stored coffee from becoming cold. Thus, 35 cups of coffee is stored by 10:00 a.m.

Since the coffee is sold in cup 23 one at a time, in consideration of a time required for sales from the storage unit 18, the extraction and storage of coffee may be started at around 9:55 a.m. and storage preparations may be started for the case where another two or three times of extraction operation are required after 10:00 a.m.

When a customer inserts money into the automatic vending machine 1 and selects coffee, the drink supply valve 21 is opened for such a time duration as to let out coffee for one cup and the coffee is supplied into the cup 23 through the drink supply tube 22 from the storage unit 18. This drink supply operation is completed in only 7 seconds, for example, thereby reducing the sales time much more than a method of extracting coffee each time a sale is made.

Since the flavor of coffee deteriorates with the passage of time, coffee in the storage unit 18 is thrown away in 30 minutes after the completion of extraction, for example. Therefore, at 10:30 a.m., coffee remaining in the storage unit 18 is thrown away and then the sales system is switched to a regular system that coffee is extracted by the extractor 14 and supplied each time the coffee selection button is depressed. When estimated 35 cups of coffee are sold by 10:30 a.m., the sales system after that is switched to the above regular system.

While sales estimates are carried out by the main control unit 2 of the automatic vending machine 1 in the prior art, sales related information required for sales estimates is sent to the center computer 11 installed at a proprietary company or the like from the automatic vending machine 1 via an appropriate communication circuit in the present invention so that the center computer 11 which is much superior to the main control unit 2 of the automatic vending machine 1 in processing speed, memory capacity and the like is used to make sales estimates. An example of the procedure is shown below.

Figure 3:
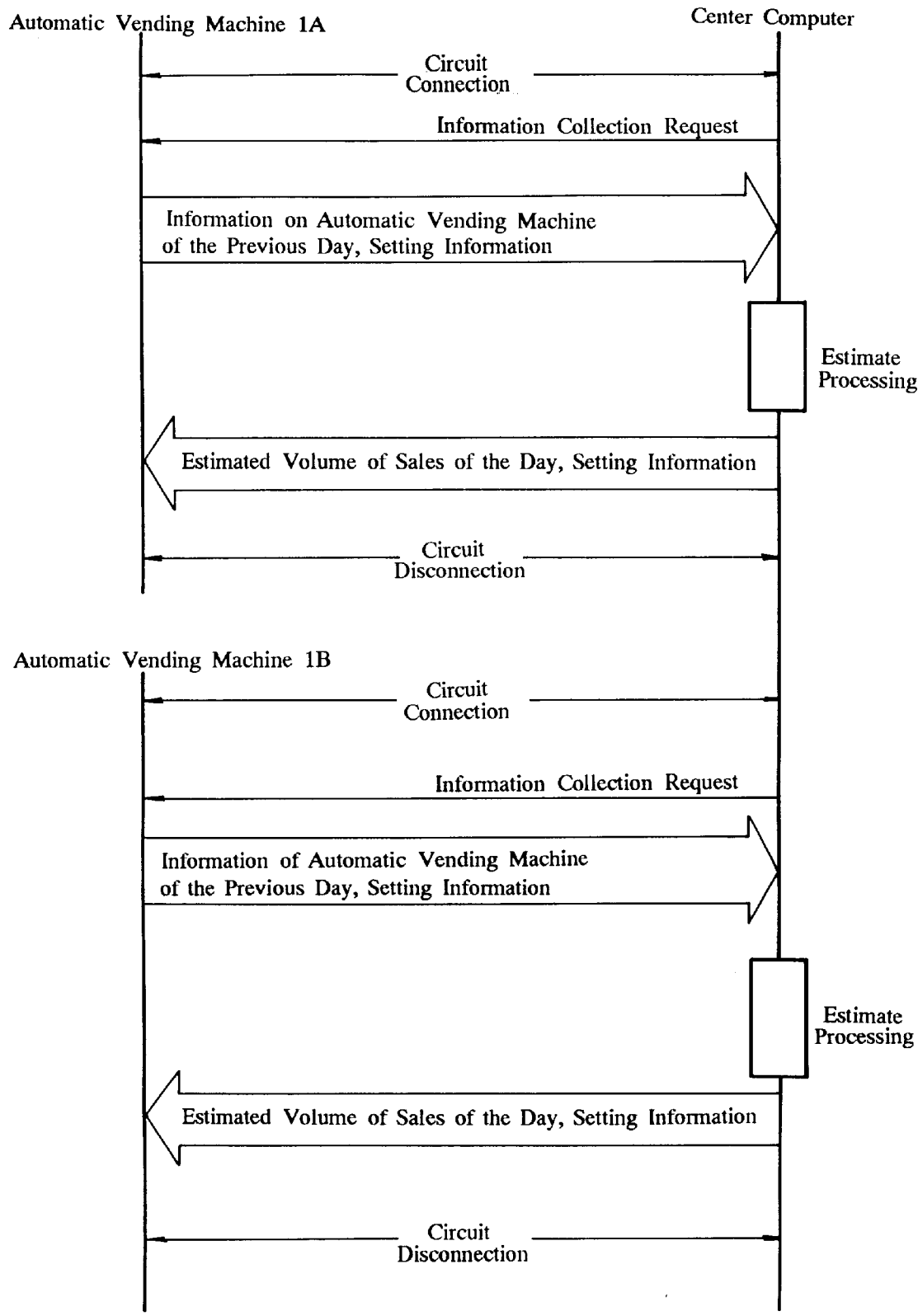
FIG. 3 is a diagram for explaining information communication between an automatic vending machine and a center computer.
Figure 4:
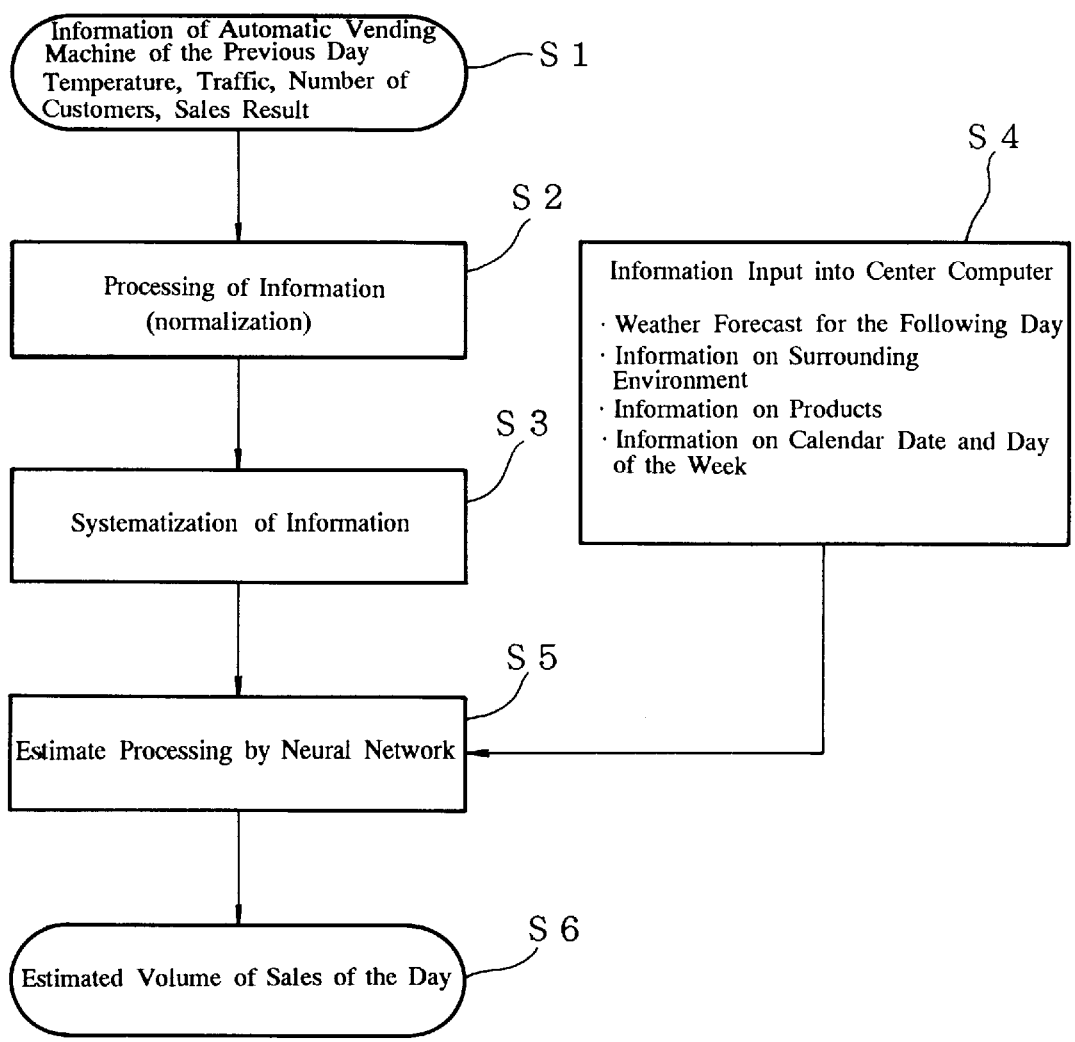
FIG. 4 is a flow chart for estimating sales volume.

FIG. 3 is a diagram showing the flow of information between two automatic vending machines 1A and 1B, which is the minimum number of a plurality to make the scheme more understandable, and the center computer 11. FIG. 4 is a flow chart of sales estimate processing.

The automatic vending machines 1A and 1B record a time and a type of product in the RAM 4 each time a product is sold (in the case of an automatic vending machine which comprises a plurality of ingredient containers 13, extractors 14 and storage units 18 to enable a plurality of product items to be sold). The automatic vending machines 1A and 1B further comprise temperature sensors and humidity sensors to detect temperatures and humidities surrounding the automatic vending machines 1A and 1B which influence product sales. The automatic vending machines 1A and 1B further comprise photosensors, video cameras and the like (which can be installed separately from the main body of the automatic vending machine) to collect information on traffic and customers. When they are installed within the premises of a company, they may be connected to a time card machine to collect information on the number of attendants as sales environment information. The automatic vending machines 1A and 1B collect such sales environment information (S1), normalize the collected information at the main control unit 2 (S2) and systematize the normalized information (S3). The thus processed information is stored in the RAM 4.

When the center computer 11 makes sales estimates, it connects its circuit to the automatic vending machine 1A and transmits an information collection request signal to the automatic vending machine 1A. The automatic vending machine 1A transmits sales information and sales environment information such as temperature and the like stored in the RAM 4 to the center computer 11. Thus, the sales related information stored in the RAM 4 of the automatic vending machine 1A is collected and stored in the center computer 11.

The collection of sales related information from the automatic vending machine 1A by the center computer 11 is carried out at a frequency of once a day before sales estimate processing is carried out. This information collection is carried out at midnight when products are rarely sold not to interfere with the sales operation of the automatic vending machine 1A. Information collection may not be carried out only once a day and the frequency and timing of collection may be suitably changed by the center computer 11.

Information on the installation sites of the automatic vending machines 1A and 1B, information on the products, information on calendar date and day of the week are directly input into the center computer 11. Further, weather forecast information is input every day as required (S4). The information on the installation sites includes information on the times of recess periods and workdays in the case of a factory, information on operating hours, holidays and others specific to each facility in the case of an amusement park in addition to information on sites such as factory, office, amusement park, station and the like. The information on products includes information on a type of each product and information on the date of marketing and the like in the case of a new product.

The center computer 11 selects information required for sales estimates from information collected from the automatic vending machine 1A and information directly input into the center computer 11, makes sales estimate processing by a neural network based on the information (S5) and determines an estimated volume of sales for each product for the automatic vending machine 1A on the day (S6).

Generally, information required for sales estimates differs according to the installation locations of the automatic vending machines 1A and 1B. For example, to make sales estimates on a workday for the automatic vending machine 1A installed at a factory or an office, sales estimate processing is made based on information, mainly sales results on workdays, the number of workers coming in, weather forecast information (ignored when air conditioning is carried out), recess period information and the like in the past. To make sales estimates for the automatic vending machine 1B installed outdoors at an amusement park or the like, sales estimates are made based on information, mainly sales results on the same day of the week, the number of visitors, weather forecast information and the like in the past.

After the completion of sales estimate processing by the center computer 11, the estimated volume of sales of each product is transmitted to the automatic vending machine 1A and then a communication circuit between the automatic vending machine 1A and the center computer 11 is disconnected. Then, the center computer 11 connects its circuit to the automatic vending machine 1B, carries out sales estimate processing for the automatic vending machine 1B in the same manner as for the automatic vending machine 1A, determines the estimated volume of sales of each product, transmits the information to the automatic vending machine 1B and disconnects its circuit with the automatic vending machine 1B.

Thus, the center computer 11 carries out sales estimate processing for a plurality of automatic vending machines 1. After the center computer 11 completes the sales estimate processing, it returns sales estimate information on which product to be sold at which time zone and how many to each automatic vending machine 1. Each automatic vending machine 1 sets the time of starting to store a product in the storage tank 18 and the volume of storage for each product based on the sales estimate information received from the center computer 11.

To enable two-way communication of information between the automatic vending machines 1A and 1B and the center computer 11, the communication function of the center computer 11 may be reinforced so that the center computer 11 can collect sales related information from the automatic vending machines 1A and 1B simultaneously, carry out sales estimate processing for the automatic vending machines 1A and 1B sequentially or simultaneously, and return obtained sales estimate results to the automatic vending machines 1A and 1B simultaneously. In this case, a communication circuit is disconnected when the center computer 11 completes information collection and then connected again after sales estimate results are obtained to transmit the sales estimate results to the automatic vending machines 1A and 1B. When a leased line whose communication fees do not have to be paid to the outside is used to connect the automatic vending machines 1A and 1B and the center computer 11, the automatic vending machines 1A and 1B are always connected to the center computer 11 so that communication therebetween is always possible.

In the case of the automatic vending machine 1 whose peak time zones can be estimated in advance, sales estimates can be made only for the time zones. For instance, in the case of the automatic vending machine 1 which has been installed at a factory, since sales concentrate at recess periods, sales estimate time zones are set to recess periods, for example, 10:00 to 10:10 a.m., 12:00 noon to 12:10 p.m., 3:00 to 3:10 p.m. and 5:00 to 5:10 p.m.

To make sales estimates for a time zone of 10:00 to 10:10 a.m., for example, sales estimate processing is carried out at 9:30 a.m., 30 minutes before 10:00 a.m. The time of starting sales estimate processing is set such that an estimated sales volume of a product can be prepared before the sales estimate time zone (the volume doesn't have to be the total estimated sales volume and the time of starting sales estimate processing doesn't have to be 30 minutes before the recess period). The center computer 11 transmits an information collection request signal to the automatic vending machine 1 (or to a plurality of automatic vending machines simultaneously) at 9:30 a.m., and the automatic vending machine 1 transmits required information to the center computer 11. In this case, the transmitted information may only be a sales volume of each product at a sales estimate time zone. Since sales estimate processing is carried out 30 minutes before the sales estimate time zone, when temperature and humidity surrounding the automatic vending machine 1 are added to information for sales estimate processing, sales estimates which are more geared to environment at the time of sales can be made.

Each automatic vending machine 1 can correct sales estimate information received from the center computer 11 based on sales environment information obtained from the temperature sensor, photosensor and the like provided therein to make required sales preparations.

For example, in a sales management method in which the center computer 11 collects sales related information from the automatic vending machine 1 at midnight, weather forecast information directly input into the center computer 11 for sales estimates may greatly differ from weather at the real time of sales. When Saturday which is usually a holiday is changed to a workday due to favorable business results or when a workday is changed to a holiday due to unfavorable business results, a sales-volume estimated by judging that it is a workday or holiday based on the calendar stored in the center computer 11 greatly differs from an actual sales volume.

Therefore, in the case of hot coffee whose sales increases as temperature lowers and decreases as temperature rises, a sales estimate value from the center computer 11 is increased according to temperature when temperature at the time of sales preparation is much lower than temperature when the center computer 11 made sales estimates, reduced when the temperature is higher, and not changed when the temperature is the same as that of weather forecast to make product sales preparations.

In the automatic vending machine 1 installed at a factory or the like, when the center computer 11 makes sales estimates based on the built-in calendar which shows that it is a holiday and the automatic vending machine 1 does not make sales preparations at all, if the photosensor or the like installed at the main gate detects a large number of employees coming in, sales preparations for an average workday in the past are made. In this case, the above correction can also be made according to temperature at the time of sales preparations. Conversely, even when the center computer 11 makes sales estimates based on the built-in calendar which shows that it is a workday and prepares a program for sales preparations at the automatic vending machine 1, if the photosensor or the like installed at the main gate does not detect any employees coming to the office, the automatic vending machine 1 considers that it is a holiday and does not make sales preparations at all.

Using the connection between a plurality of automatic vending machines 1 and the center computer 11 by means of a communication circuit, not only sales estimate results but also other information such as data for changing parameter conditions may be transmitted from the center compute 11 to each of the automatic vending machines 1. The data for changing parameter information include data on a time when a prepared and stored product should be thrown away after extraction, a batch decision level for determining the amount of extraction by making predetermined correction on an estimated sales volume at a certain time zone, and the like. If such data for changing parameter conditions can be transmitted, the parameter conditions can be changed in batch by inputting the data into the center computer 11 and transmitting a control signal without transmitting the data to each of the automatic vending machines 1.

Further, making use of high throughput of the center computer 11, more accurate estimates can be made by combining sales information of other automatic vending machines 1 with sales information on the automatic vending machine 1 whose sales are to be estimated and weather forecast information such as weather, temperature and humidity. In this case, information on customers is obtained by taking a picture of each customer with a video camera or the like installed at the automatic vending machine 1 and judging type of the customer based on the picture. Further, since sales information of each automatic vending machine 11 is collected at the center computer 11 of the control center, market research can be conducted using the information. Furthermore, a time required for supplying products and a time required for changing products for other ones can be determined based on the information.

The present invention is not limited to the sales management of a cup type automatic vending machine which prepares and stores products. The present invention can also be applied to a canned drink automatic vending machine for selling heated or cooled canned drinks by increasing the number of previously heated drinks based on sales estimates and to a food automatic vending machine for selling foods, e.g. foods obtained by injecting hot water into dried noodles, by increasing the amount of stored hot water based on sales estimates, thereby increasing sales in response to meet growing demand at a specific date and time by making sales preparations.

Industrial Feasibility

As described above, according to the sales management method for automatic vending machines of the present invention, the center computer having higher throughput than a processing unit which each automatic vending machine can incorporate economically and installed at a proprietary company or the like carries out sales estimate processing and hence, the processing burden of each automatic vending machine for sales estimates can be almost eliminated.

Further, as the center computer holds most of information used for sales estimates, the volume of information which the automatic vending machine should store is reduced and the automatic vending machine does not require a large-capacity memory. Further, as the center computer having a high throughput and a large-capacity memory can be used, it is possible to handle a larger volume of information for sales estimates, thereby further enhancing the accuracy of sales estimates.

I claim:

1. A sales management method for a vending machine in which the product it vends is at least partially prepared in advance prior to the beginning of a period of time of vending the product comprising:

producing, at the machine, sales information of the product vended and of the sales environment relative to the machine;

establishing, at a central computer, sales estimate information of the product for the machine based on at least one of the sales information obtained from the machine and sales environment data entered in said central computer;

transmitting said sales estimate information to said machine;

modifying at the machine the sales estimate information received from the central computer by the sales environment information produced relative to the machine for determining the quantity of the product to be at least partially prepared at the machine; and at least partially preparing a quantity of the product to be vended based upon said sales estimate information received from said central computer.

2. A method as in claim 1, wherein said sales environment data relative to said machine comprises at least one of temperature, humidity and traffic encountered by the machine.

3. A method as in claim 1, wherein said sales environment data entered in said central computer comprises at least one of temperature and calendar date and day of week.

4. A method as in claim 1, wherein said sales environment data relative to the machine comprises at least one of temperature, humidity and traffic encountered by said machine.

5. A sales management system for managing automatic vending machines, comprising:

a plurality of automatic vending machines for vending a product which is necessarily prepared for vending before starting vending, at least one of said machines including a sensor means for generating sales environment information and means for producing sales information regarding product sold by the machine;

memory means for storing at least one of sales environment information and sales information;

a central computer, including processing means, for processing at least one type of information selected from information obtained from each of said plurality of automatic vending machines and at least one type of information on the product of a machine and weather forecast information to make sales estimates for each of said automatic vending machines and for outputting the sales estimates to each of said automatic vending machines;

communication means for communicating with said plurality of automatic vending machines and said central computer to transmit said sales estimates there between;

means, in each of said automatic vending machines, to correct the sales estimate received from the central computer via the communication means based on the latest sales environment information relative to a machine before the machine starts the required preparations; and preparation means at each of said automatic vending machines to start required preparation of the product to be vended based on the sales estimates.

6. The sales management system for managing automatic vending machines according to claim 5, wherein a said machine sensor means for generating sales environment information comprises a sensor for sensing at least one of temperature, humidity and traffic relative to the machine.

7. The sales management system for managing automatic vending machines according to claim 5, wherein a machine transmits sales information to the central computer for use thereby in making the sales estimate.

* * * * *

UNITED STATES PATENT AND TRADEMARK OFFICE
CERTIFICATE OF CORRECTION

PATENT NO. : 6,021,394
DATED : Feb. 1, 2000
INVENTOR(S) : Toshiyuki TAKAHASHI

It is certified that errors appear in the above-identified patent and that said Letters Patent is hereby corrected as shown below:

Title page, add

--[30] Foreiagn Application Priority Data

Dec. 27, 1995 [JP] Japan ..................................7-353712-.

Signed and Sealed this

Sixth Day of February, 2001

Attest:

Q. TODD DICKINSON

*Attesting Officer*  *Director of Patents and Trademarks*